United States Patent
Yamashita et al.

(10) Patent No.: US 10,934,092 B2
(45) Date of Patent: Mar. 2, 2021

(54) METHOD OF ORDER FULFILLING BY MAKING STORAGE UNITS AVAILABLE FROM A STORAGE FACILITY IN A DESIRED SEQUENCE AT A PICKING STATION

(71) Applicant: Dematic GmbH, Heusenstamm (DE)

(72) Inventors: Shin Yamashita, Oberursel (DE); Carlos De Oliveira, Montévrain (FR)

(73) Assignee: Dematic GmbH, Heusenstamm (DE)

( * ) Notice: Subject to any disclaimer, the term of this patent is extended or adjusted under 35 U.S.C. 154(b) by 317 days.

(21) Appl. No.: 16/063,116

(22) PCT Filed: Nov. 29, 2016

(86) PCT No.: PCT/EP2016/079157
§ 371 (c)(1),
(2) Date: Jun. 15, 2018

(87) PCT Pub. No.: WO2017/102315
PCT Pub. Date: Jun. 22, 2017

(65) Prior Publication Data
US 2020/0172334 A1  Jun. 4, 2020

(30) Foreign Application Priority Data
Dec. 17, 2015 (EP) .................................... 15200843

(51) Int. Cl.
*B65G 1/137* (2006.01)
*B65G 1/04* (2006.01)
(Continued)

(52) U.S. Cl.
CPC ......... *B65G 1/1378* (2013.01); *B65G 1/0414* (2013.01); *B65G 1/0485* (2013.01);
(Continued)

(58) Field of Classification Search
CPC ... B65G 1/0492; B65G 1/0414; B65G 1/1378
See application file for complete search history.

(56) References Cited

U.S. PATENT DOCUMENTS 8,790,061 B2   7/2014 Yamashita
8,973,506 B2   3/2015 Yamashita
(Continued)

FOREIGN PATENT DOCUMENTS

DE   29912230 U1   11/1999
EP   1590272 B1    8/2010
(Continued)

OTHER PUBLICATIONS

International Search Report of the International Searching Authority from corresponding Patent Cooperation Treaty (PCT) Application No. PCT/EP2016/079157, indicated completed on Feb. 28, 2017.
(Continued)

*Primary Examiner* — Thomas Randazzo
(74) *Attorney, Agent, or Firm* — Gardner, Linn, Burkhart & Ondersma LLP

(57) ABSTRACT

A method of fulfilling orders from a queue of a plurality of orders in an automated storage facility with storage of items of the same kind in receptacles stored in a rack. When items to complete an order are available, automatic storage and retrieval devices retrieve and transport receptacles containing items for fulfillment of an order to a picking station. Each aisle is connected to one of the picking stations and receptacles containing items for orders to be fulfilled at such connected picking station are stored within the connected aisle. When the specific receptacle for the order is retrieved it is checked according to predetermined criteria whether the same item is needed for fulfillment of further orders and if so items from the receptacle are placed into separate recep-
(Continued)

tacles for storage in different aisles according to picking station assignment for the further orders.

19 Claims, 4 Drawing Sheets

(51) Int. Cl.
*G06Q 10/08* (2012.01)
*B65G 1/06* (2006.01)

(52) U.S. Cl.
CPC ........... *B65G 1/0492* (2013.01); *B65G 1/065* (2013.01); *B65G 1/1376* (2013.01); *G06Q 10/087* (2013.01); *B65G 2203/0208* (2013.01); *B65G 2209/10* (2013.01)

(56) References Cited

U.S. PATENT DOCUMENTS

| | | | |
|---|---|---|---|
| 8,974,168 B2 | 3/2015 | Yamashita | |
| 9,266,675 B2 | 2/2016 | Yamashita | |
| 9,452,886 B2 | 9/2016 | Yamashita | |
| 9,522,781 B2 | 12/2016 | Hortig et al. | |
| 9,630,777 B2 | 4/2017 | Yamashita | |
| 2002/0021954 A1* | 2/2002 | Winkler | B65G 1/023 414/273 |
| 2002/0026347 A1 | 2/2002 | Yanagino | |
| 2009/0129902 A1* | 5/2009 | Schafer | B65G 1/1378 414/274 |
| 2011/0008137 A1 | 1/2011 | Yamashita | |
| 2011/0295413 A1 | 12/2011 | Hara et al. | |
| 2012/0185082 A1* | 7/2012 | Toebes | B65G 1/0492 700/218 |
| 2014/0100715 A1 | 4/2014 | Mountz | |
| 2014/0249666 A1* | 9/2014 | Radwallner | B65G 1/137 700/216 |
| 2015/0378345 A1* | 12/2015 | Winkler | B65G 1/1378 700/216 |
| 2016/0130085 A1* | 5/2016 | Yamashita | B65G 1/1373 414/807 |
| 2016/0130086 A1* | 5/2016 | Yamashita | B65G 1/1373 414/807 |
| 2016/0229633 A1* | 8/2016 | Yamashita | B65G 1/1373 |
| 2016/0229634 A1* | 8/2016 | Yamashita | B65G 1/1378 |
| 2016/0347545 A1* | 12/2016 | Lindbo | B65G 61/00 |
| 2016/0355337 A1* | 12/2016 | Lert | B65G 1/0492 |
| 2019/0152703 A1* | 5/2019 | Sellner | B65G 1/1378 |

FOREIGN PATENT DOCUMENTS

| | | |
|---|---|---|
| EP | 2170742 B2 | 10/2012 |
| EP | 2826728 A1 | 1/2015 |
| WO | 2012044734 A1 | 4/2012 |
| WO | 2014023539 A1 | 2/2014 |
| WO | 2015007513 A1 | 1/2015 |
| WO | 2015007514 A1 | 1/2015 |
| WO | 2015118171 A1 | 8/2015 |
| WO | 2017080914 A1 | 5/2017 |

OTHER PUBLICATIONS

Written Opinion of the International Searching Authority from corresponding Patent Cooperation Treaty (PCT) Application No. PCT/EP2016/079157, indicated completed on Feb. 28, 2017.
International Preliminary Examination Report from corresponding Patent Cooperation Treaty (PCT) Application No. PCT/EP2016/079157, dated Mar. 28, 2018.

* cited by examiner

METHOD OF ORDER FULFILLING BY MAKING STORAGE UNITS AVAILABLE FROM A STORAGE FACILITY IN A DESIRED SEQUENCE AT A PICKING STATION

CROSS REFERENCE TO RELATED APPLICATION

The present application claims the priority benefits of International Patent Application No. PCT/EP2016/079157, filed on Nov. 29, 2016, and claims benefit of EP 15200843.9, filed on Dec. 17, 2015.

BACKGROUND OF THE INVENTION

The invention relates to a method of order fulfilling.

When operating storage facilities for order fulfillment several aspects must be taken into account as described below.

While picking or compiling orders from transporting units, such as e.g. articles or containers, it is necessary to provide the transporting or storage units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletization area, pack station, goods issue, shipment etc.

In the pack station the goods for fulfilling an order are taken from the storage units and placed according to the order into an order container etc. The storage container (often called donor) is then routed back into the racking storage and stored until needed for the next order.

It is common to store all items or article in as few storage units (containers, receptacles etc.) as possible to make best use of the available storage area.

Order fulfillment of orders placed over the Internet must take place within a relatively short period of time in order to be commercially competitive. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag that identifies the SKU of the item.

Because of the large number of SKU's from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. In this way, each order may be contained in a number of picked receptacles if the order contains more than an individual item. However, it is then necessary to subsequently sort the contents of the picked receptacle(s) to the order and to process the items so that they can be packed-out for shipment via courier. Also, orders may be made up of items having various physical characteristics such that some items are not able to be readily handled by a conventional material-handling system. Such items are known as non-conveyables.

US 2011/0295413 A1 discloses singulation of batch wise picked items from a batch container into single containers with a single item per container.

EP 2 170 742 B2 discloses a method in which at a singulation station of a materials handling facility, individual units of items from collections of items are selected, wherein the collection of items includes units of heterogeneous items picked from inventory storage of the materials handling facility to fulfill a plurality of orders; associating an item identifier of a particular item of the individual units of items with a receptacle identifier of a particular conveyance receptacle of a plurality of conveyance receptacles; associating the particular conveyance receptacle with a particular order that specifies at least one unit of the particular item. In Other words articles from a mixed or dirty batch picking process are singulated by putting a single separate article into/onto a conveyance receptacle and marrying these by correlating their identifiers in a database. From then on only the receptacle identifier is tracked throughout the facility.

Further it is difficult to manage fluctuations in demand within storage facilities. Manually run storage facilities with manual pack stations usually capable of managing the fluctuation and have low initial costs and can be very effective for very slow moving articles in general and fast moving particularly across limited articles and low cost labor situations. However they must be larger in space to handle the same amount of orders as automated high bay systems. In addition, it is difficult to control the progress of manual operations in the timely fashion and running cost and even availability of labor may become an issue in high cost labor situations. Also the so-called fast movers may change due to daily fluctuations, time of year etc.

On the other hand it is desirable to minimize the material handling devices needed in the so-called prezone of automated storage racks. WO 2014/023539 A1 to the applicant therefore suggests using a storage facility in which the receptacles are stored in a plurality of storage racks and storage rack levels, wherein the storage racks not arranged on the outside are each arranged in pairs adjoining one another and have a racking storage aisle on one side. In the aisle and level automated storage and retrieval devices (ASRS) in the form of shuttles are used to place the receptacles into storage and remove them from storage. Lifts are used to supply and discharge the receptacles to and from the levels. To do away with most of the prezone material handling machinery, receptacles are exchanged between two adjoining storage racks directly, i.e. exchange of receptacles takes place from one storage racking aisle to an adjacent storage racking aisle via transverse conveyance locations in the storage racks themselves and the receptacles are pushed and/or pulled through to the racking on the other side by use of the shuttles themselves, i.e. their load handling means in form of telescopic arms. This is called inter-aisle-transfer (iAT) technology.

To achieve high throughput, each aisle of such storage facility is directly connected to a picking station (see WO 2015/007514 A1). This also allows buffering and sequencing the storage receptacles, containing items to be picked for an order, to the picking station in the needed time and order.

If, however many of the items needed for an order are stored in different aisles the inter-aisle-transfer (iAT) technology may be overburdened and might create a bottle neck.

Therefore, common procedure is to store all needed items within the respective aisle of the automated and therefore fast storage system. However, if so-called fast movers are stored in each aisle of the automated storage system, it is full of reserved storage units which may not be needed for a while and will clog up the automated space.

Therefore, a tradeoff between storage density and availability must be made.

EP 2 826 728 A1 discloses a method of fulfilling orders by making orders available in order units by picking from product units in a storage facility wherein, —the storage facility has a manual storage and picking area; —the storage facility has an automated storage and retrieval racking area; —the automated storage and retrieval racking area is arranged downstream or upstream from the manual picking area and is connected to the manual picking area by a routing conveyor, which leads to a shipping area; —the manual storage and picking area comprises manual picking stations supplied and arranged along the extension of the routing conveyor; —the automated storage and retrieval racking area comprises: —a storage racking comprising a plurality of multilevel storage racks wherein the storage racks are disposed back-to-back in pairs and have an aisle between pairs; —at least one storage-entry conveyor provided for feeding order and/or product units into the storage racking; —at least one storage-exit conveyor provided for retrieval of order and/or product units from the storage racking; —at least one automatic storage and retrieval device provided for each storage racking aisle, wherein the order and/or product units are stored and retrieved from the storage racks by the automatic storage and retrieval; —at least one lifting device used, in order to transfer the order and/or product units to the at least one storage-exit conveyor; —at least one fully or semiautomatic picking station for picking from product units into order units for fulfilling orders; —wherein order and/or product units are exchanged directly between two adjoining storage racks; wherein the routing conveyor is connected to the at least one inbound storage-entry conveyor and/or the at least one storage-exit conveyor of the storage racking.

WO 2015/118171 A1 discloses use of an intermediate holding facility in the form of racks that are available/shared between picking stations. As such adjacent picking stations have mutual access to source containers. However this does not allow for flexible use of source containers for picking stations not being adjacent.

SUMMARY OF THE INVENTION

The object of the invention is to provide a method of order fulfilling, which allows high storage density but does not require an availability tradeoff.

In accordance with aspects of the invention, it has been recognized that an effective and space saving order fulfillment may be performed, if at the time of retrieval of the specific receptacle containing an item for the certain order it is checked according to predetermined criteria if the same item is needed for fulfillment of further orders and if this is the case items from the receptacle are placed into separate receptacles for dedicated storage in different aisles according to picking station assignment for said further orders.

This allows optimizing the storage density over time as only at the time of use (or use in the near future) items are stored in separate receptacles. This also provides for quicker response of the system as picking stations can be quickly provided with the needed receptacles containing items as they do not need to be transferred to the correct aisle at the time of picking but this can take place earlier, after separation.

In contrast to WO 2015/118171 A1 no additional holding facility is necessary as the receptacles are all stored in the same storage. Further the method of the invention is more flexible as it allows for use of separated receptacles at all picking stations and not only adjacent ones.

Separation of items may be performed at a dedicated separation station or at said picking station(s).

The predetermined criteria for checking preferably comprises one or a combination of
a) whether the same item is needed for fulfillment of further orders from the queue (of orders in the warehouse management software/database) at the given point in time;
b) whether the same item is needed for fulfillment of further orders from the queue at the given point in time within a predetermined time window;
c) whether the same item is predicted to be needed for fulfillment of further orders based upon past order history within a predetermined time window;

It is possible to place total number of items needed for orders associated with a single aisle or certain picking station into a (common) receptacle during the separation process. This maximizes use of "separation" receptacles. It also possible to place total number of items needed for orders of neighboring aisles or neighboring picking stations into a receptacle. This shortens iAT exchanges and paths. Accordingly it also possible to place a number of items for each further order into a dedicated separate receptacle for each further order. Alternatively it is also possible to place one item for a further order in each receptacle. This allows for quick and easy picking.

The automated storage may comprise a three dimensional racking for storage of receptacles with automatic storage and retrieval devices, preferably shuttles, servicing each aisle and preferably each level, wherein the automatic storage and retrieval devices, preferably shuttles, themselves have load handling means which allow transfer of receptacles directly between adjoining racks by pushing or pulling the receptacles from a source rack location of a first rack to a destination rack location of an adjoining second rack. Therefore use of dedicated exchange technology for exchange of receptacles between racks is not necessary. Each such aisle may be connected to a picking station.

The automated storage facility may be partially or fully automated. The automated storage may further comprise a sequencer or buffer. It may be connected to said picking stations. The automated storage will usually include a routing conveyor, which leads to a shipping area. The routing conveyor may connect all areas and may serve as a dispatch conveyor for dispatch of complete orders to a shipping area from the picking stations or storage.

The term "receptacles" includes totes, trays, containers, paperboard containers, carton boxes etc. If not denoted otherwise receptacles may be generally of the donor type containing inventory stored and not allocated to any order, in other words items are picked from these receptacles; or order type containing picked items, i.e. containing completed orders or orders in progress. Some or all receptacles may be subdivided into compartments, so that transport and choice of items are facilitated. Non-subdivided receptacles may be used to induct single or even multiple items. This is more flexible for putting items with differing dimensions into the same receptacle. If the receptacles are subdivided, the compartments may be of equal and/or differing size.

Usually such compartments make sense for small items therefore large number of items can be put in single receptacle. The receptacles may be subdivided into eight or less compartments. The subdivision may be performed by radially centered walls within the container etc. or by angular walls within the receptacles. Obviously not all receptacles need be subdivided in the same manner and several different kinds of subdivided receptacles can be used as required in parallel or divider arrangement can also be changed dynamically.

The automated storage facility comprises a storage racking comprising a plurality of multilevel storage racks in which order and/or product units are stored, wherein the storage racks are disposed back-to-back in pairs and have an aisle between pairs. In other words the racks have an aisle between them and each rack abuts a rack of a neighboring aisle.

All receptacles are fed into the storage racking by at least one storage-entry conveyor and retrieved by at least one storage-exit conveyor. Preferably one storage-entry conveyor and one storage-exit conveyor are provided for each aisle. These conveyors may be connected to the routing conveyor.

Each storage racking aisle is serviced by at least one automatic storage and retrieval device (AS/RS) for storage and retrieval of receptacles from the storage. Preferably each level of each aisle has a dedicated AS/RS machine but also AS/RS devices serving two and more levels are possible. It is most preferred that the automatic storage and retrieval device are so called shuttle, that only service a single aisle and level.

In a preferred embodiment the automatic storage and retrieval devices, preferably shuttles, themselves have load handling means which allow transfer of receptacles directly between adjoining racks by pushing or pulling the receptacles from a source rack location of a first rack to a destination rack location of an adjoining second rack.

Receptacles are exchanged directly between two adjoining storage racks from a source storage rack to an adjacent destination storage rack via cross conveyance locations in the storage racks themselves. This allows sorted retrieval from storage in a simpler manner and without sortation outside of the aisles. This reduces technical complexity and space, lowers cost and achieves better reliability.

In accordance with the invention, it has been also recognized that when receptacles are exchanged directly between two adjoining storage racking units from one rack of a storage racking aisle to an adjacent rack of a next storage racking aisle via cross conveyance locations in the storage racking units, distribution and/or complex sorting in the front-zone can be omitted, since the receptacles are already stored in a single storage rack aisle even if initially they were stored elsewhere. When retrieved from storage, they are simply retrieved in sequence. Therefore a direct transfer of receptacles without distribution or sorting outside of the aisles can be achieved without "crossing" conveyors and this with a simpler and smaller technical installation with smaller space and higher reliability. The receptacles can therefore just be retrieved from the respective aisle in the required sequence. This allows for reduction of the so-called front-zone installations. The storage is preferably a fully automated storage. In other words, storage racking locations of abutting racks are used for passing receptacles from one side of the racking through to the next, so that the transporting units can be transferred from one racking to the next.

So, the automated storage comprises a three dimensional storage of receptacles with AS/RS servicing each aisle and possibly each level, wherein the AS/RS themselves have load handling means which allow transfer of receptacles directly between adjoining racks by pushing or pulling the receptacles from a source rack location of a first rack to a destination rack location of an adjoining second rack, and each aisle is connected to a picking station. Therefore, cross conveyance or sorting is possible inside the racking units themselves and accordingly it is possible to dispense with "cross conveyance" in the front-zone completely. If necessary however, the use of a front zone conveyor for cross conveyance may be combined with this concept especially if the front zone conveyor cannot be omitted for other reasons than cross conveyance, while reducing the complexity and throughput requirements of the front zone conveyor and control system.

In an expedient manner, the cross conveyance locations are provided in each level or any selected level of the storage racking units. Particularly effective path-time optimization is achieved if the cross conveyance locations are disposed closer to inbound and outbound conveyor line. It is also possible to locate cross conveyance locations at different positions within a level. The cross conveyance locations can also be used as buffers, especially if they belong to final destination aisle of the receptacles, i.e. the transporting or storage units remain therein, until they are actually needed or retrieved.

The exchange within the cross conveyance locations can be effected actively or passively with regard to the AS/RS, i.e. on the one hand the cross conveyance location can be simply a passive storage surface, on which the AS/RS of one aisle deposits receptacles (places them into storage) and from which the AS/RS of the adjacent aisle receives receptacles (removes them from storage). For each racking storage location or cross conveyance location this procedure can always be performed in one direction only or in both directions.

The automatic storage and retrieval device itself displaces the receptacles in the cross conveyance locations, i.e. it is most preferred that the AS/RS itself is the active handling means, i.e. the receptacles are handled only by the AR/RS also for exchange in the cross conveyance locations and these do not have any kind of own drive means.

By reason of the simplicity of the cross conveyance locations it is also possible to subsequently retrofit or refit cross conveyance locations and to adapt flexibly to the level of efficiency required in the storage system simply by changing normal racking positions accordingly.

For exchange purposes, the AS/RS can likewise place receptacles in double-depth storage or multiple-depth storage in the cross conveyance location. The AS/RS of one aisle can thus place the receptacles in storage in the cross conveyance locations to such a depth that they are already to be assigned to the adjacent racking and can be reached "normally" by the AS/RS, in other words the automatic storage and retrieval device of a source rack places the receptacles into the cross conveyance location in an adjacent destination rack. In addition, the load receiving means, e.g. telescopic arms, can have an extended range. It is also possible to use a stacked storage of receptacles.

Since the cross conveyance locations are subject to be utilized extensively and to reduce damage of receptacles, it is expedient if the floors of the cross conveyance locations be coated to reduce friction. Also structural reinforcement can be implemented.

It is preferable if the AS/RS are "miniloads" or single-level racking serving units. In particular shuttles or satellite vehicles are preferred. A "miniload" AS/RS is a floor run multilevel storage and retrieval machine with a flexible load handling device that supports a wide range of individual articles, bundled or stacked articles, containers, trays, cartons of different sizes and weights.

It is particularly preferred that the automatic storage and retrieval devices are shuttles. Such shuttle are rail based carts with a load carrying area and telescopic load handling means allowing discharge and take up to both sides of the shuttle. Shuttles usually travel along the rails in an aisle and certain level. The rails are mostly incorporated into the front racking structure and provide electricity as well as signals. Also shuttles with a stacked arrangement of two load handling platforms or an elevating platform are to be used in connection with the invention for handling several levels from a single rail. Shuttle as such are known in the prior art.

The shuttle can be used in two arrangements, a so called "captive" or "roaming" arrangement. In the captive arrangement the shuttle stay in their respective level. In the roaming alternative the shuttle change levels as required.

It is thus possible in accordance with the invention to achieve a particularly high level of retrieval efficiency whilst fully maintaining the desired sequence of transporting or storage receptacles in any aisle. This is also achieved with considerably less technical work than in accordance with the Prior Art.

At least one lifting device is used, in order to transfer receptacles to the at least one storage-exit conveyor, i.e. the lift allows for level changes of receptacles coming from the storage-entry conveyor or destined to the storage-exit conveyor. Usually this will be a stationary lift, but also AS/RS with lift functions (e.g. mini-load) could be envisioned. The at least one lift is optionally of the drive-through-type, meaning that receptacles may pass through the lift within the rack, as if it were a conveyor. In a preferred embodiment a lift is installed in each rack of an aisle and each lift is either an inbound-lift connected to the storage-entry conveyor or an outbound-lift connected to the storage-exit conveyor or inbound and outbound-lift connected to both storage-entry and storage-exit conveyor.

Possible lifts include in particular vertical conveying means. It is favorable if each lift has one or more, in particular two, locations/positions for receptacles. It is also beneficial if each level of the storage racking has at least one buffer location for decoupling the single-level AS/RS, e.g. shuttle, and the lift. This renders it possible to fully utilize the quicker single-level AS/RS and to prevent empty-running of the lift.

It is also advantageous if each lift has a separately driven conveying means for each location. In particular, it is then advantageous if each lift has two locations which are each provided with a separately driven conveying means movable in different directions. Therefore, the transfer of two receptacles for each level can always be effected simultaneously in different directions or onto different outbound buffers, e.g. to the left and right. In addition, the reception of the receptacles onto the lift is preferably controlled so that two receptacles are discharged onto one level. This is possible on account of the high efficiency of the shuttles used, since the transfer locations (buffer location) to the lift are practically always occupied, so that for the control of the lift there is provided a selection option which allows the lift to be occupied accordingly by receptacles for different buffers of one level.

The automated storage should also be connected to at least one fully or semiautomatic picking station for picking from donor receptacles into order receptacles for fulfilling orders, to which receptacles are fed by the at least one storage-exit conveyor and from which receptacles are dispatched by the at least one storage-entry conveyor. It is also possible to use several fully or semiautomatic picking stations and especially one for each aisle.

In the present application a fully automated order picking station is defined as a picking station according to the goods-to-person principle with fully automated receptacle handling, i.e. a fully automated supply and discharge and presentation of the receptacles. Empty order receptacles and receptacles with picking goods are automatically supplied to the station. Receptacles are placed in ergonomically optimal height on the pack station. Usually such a station will also incorporate means for directing, instructing and controlling as well as supervising the picker (e.g. pick-to-light etc.), who will still manually pick out of donor receptacles into order receptacles. As an option, the operator may be replaced with an automated picking device/machine to realize a fully automated picking process. In contrast a semiautomatic picking station will not have the fully automated receptacle handling just described, but will involve manual processing of receptacles.

The automated storage facility may also be connected to automated palletizers. The automatic storage and retrieval device (AS/RS) may be fed by an inbound-buffer and may feed into an outbound-buffer, wherein the buffers are arranged within storage racks, and the cross conveyance locations are arranged preferably but not limited to directly behind/next to the inbound-buffer and/or outbound-buffer of a corresponding storage rack.

Further it is possible to form a conveyor loop with the at least one storage-entry conveyor, the at least one lift and the at least one storage-exit conveyor, wherein the at least one lift is fed by the storage-entry conveyor and itself feeds the storage-exit conveyor. Then the outbound-buffer may feed into the conveyor loop and inbound-buffer can be fed by the conveyor loop. The pack station should be incorporated into the loop.

Preferably the routing conveyor has either one or two levels per each picking level and there may be more than one picking level. In a particularly preferred embodiment the lower level routing conveyor supplies partial order and/or donor receptacles from the storage racking of the automated storage to the fully or semiautomatic picking station and the upper level routing conveyor returns partial or completed order and/or donor receptacles to the storage racking of the automated storage. Then it is possible that the lower level routing conveyor supplies empty receptacles to the fully or semiautomatic picking station. The other way around is also possible, meaning that upper level routing conveyor supplies partial order and/or product units as well as handing empty receptacles and lower level routing conveyor returns partial order/donor receptacles.

A single level conveyor is preferred when there is no need for handling order totes within the system, then donor receptacles can be retrieved one after another in the sorted fashion and no empty order unit must be handled.

The order or donor receptacles can be placed in storage randomly ("chaotically") being distributed over the entire system without knowledge of the subsequent sequence when they are retrieved. In contrast to DE 299 12 230 U1 no restriction as to possible modules or storage areas is required.

The invention is further characterized by a high degree of flexibility, since the inbound and outbound feeding lines can be connected to the corresponding lifts at any points.

In parallel with the outbound lifts, it is likewise possible to provide dedicated inbound lifts with correspondingly supplying distribution feeding lines. On the other hand, it is also possible to control the outbound lifts such that in addition to the outbound operation they can also be used as inbound lifts. In the reverse scenario, optionally present dedicated inbound lifts can also be used as outbound lifts according to requirement. In the event of malfunctions of individual lifts, this also permits uninterrupted operation or an increase in system efficiency. To this end, the inbound or outbound lines must be disposed between the lift and racking at different heights. This requires the presence of two similar combined inbound and outbound levels, the collecting lines of which are brought together after passing the last outbound line in sequence.

The transverse displacement function, i.e. the exchange of receptacles within the cross conveyance locations in the rack by the AS/RS itself, offers the advantage that, in the event of a malfunction of e.g. an outbound lift/inbound lift or feeding lines, the function of the relevant aisle can be maintained.

The automated storage facility may also comprise sequencers, routing conveyors or put-walls. Further features and details of the invention are apparent from the description hereinafter of the drawings.

DESCRIPTION OF THE PREFERRED EMBODIMENTS

Figure 1:
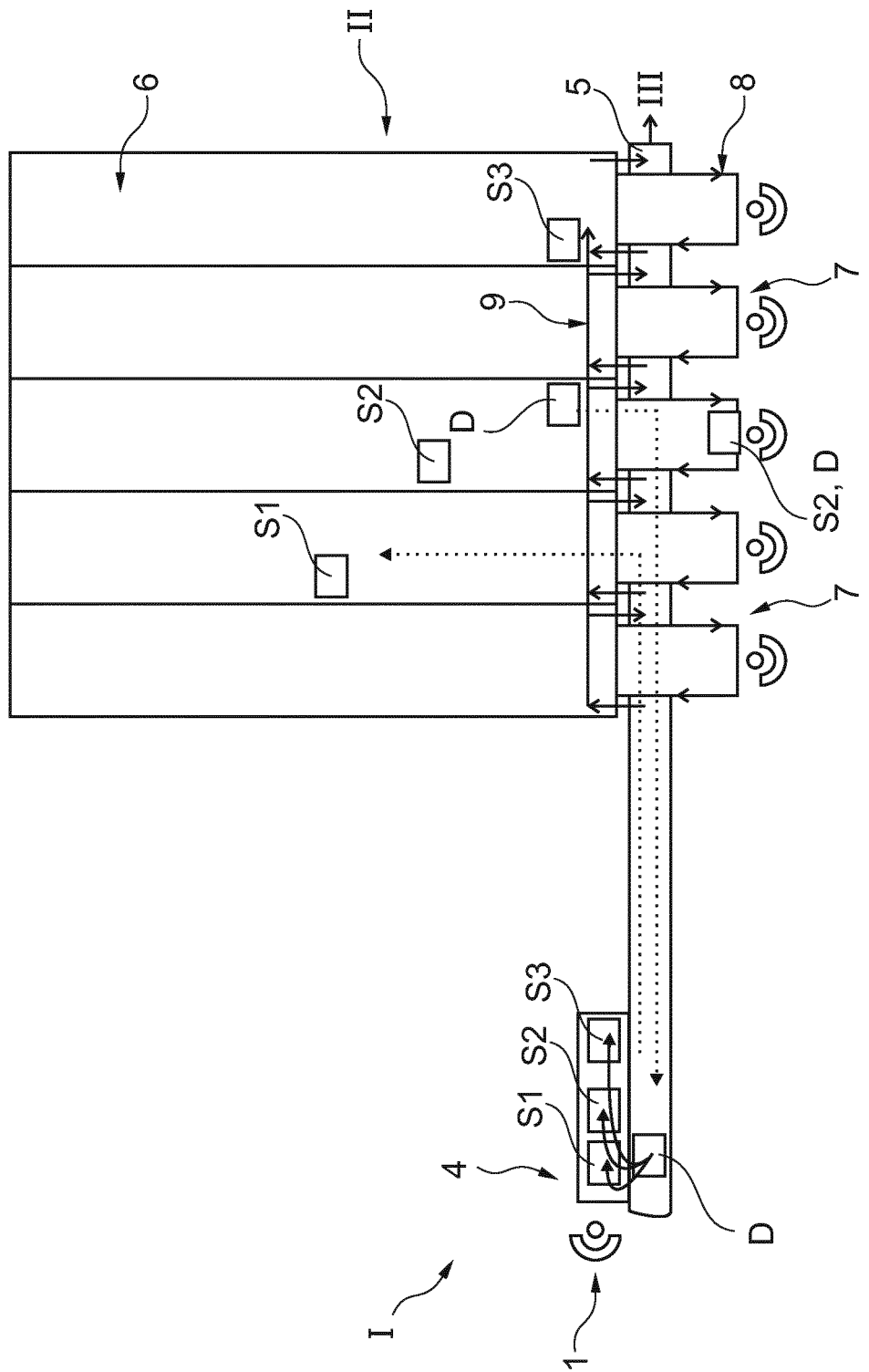
FIG. 1 shows a schematic plan view of a storage facility with a manual storage and picking area and an automated storage and picking area.

In FIG. 1 a schematic plan view of a storage facility with a separation area I and with an automated storage II is shown. The automated storage II is connected to the separation area I by a routing conveyor 5, which eventually leads to a shipping area III. The automated storage II comprises a three dimensional racking 6 for storage of receptacles with shuttles 11 servicing each aisle 13 and each level. When all of the items to complete an order are available in the automated storage II, the corresponding receptacles containing the items for fulfillment of the certain order are retrieved and transported to one of a plurality of picking stations 7 of the automated storage II for specific item retrieval for fulfilling the certain order.

Each aisle 13 is directly connected to one of the plurality of picking stations 7 and receptacles O containing items for orders to be fulfilled at such connected picking station 7 are stored within the connected aisle 13. At the picking station 7 retrieved items are picked from the (donor) receptacles D and packed with other retrieved items of an order for order fulfillment into order receptacles O.

At the time of retrieval of the specific receptacle containing an item for the certain order it is checked according to predetermined criteria whether the same item is needed for fulfillment of further orders and if this is the case items from the receptacle are placed into separate receptacles S1, S2, S3 ... Sx for dedicated storage in different aisles 13 according to picking station 7 assignment for the further orders.

To perform this separation, the corresponding receptacle D is transferred to a dedicated separation station 4, e.g. via the routing conveyor 5 on a specific level. At the separation station 4 an operator 1 places items from the donor receptacle D into separate receptacles S1, S2, S3 ... Sx as needed. These separate receptacles S1, S2, S3 ... Sx are then routed back into the storage racking 6 into the aisles 13, corresponding to the further orders. This process of separation is indicated by the arrows in FIG. 1. Separation of items may also be performed at the picking station(s) 7.

The predetermined criteria for checking is in the present case whether the same item is needed for fulfillment of further orders from the queue (of orders in the warehouse management software/database) at the given point in time in the future and have been assigned to a different aisle. If there is more than one order associated with such an aisle, the total number of items needed for all of those orders all associated with the single aisle or certain picking station are placed into a mutual receptacle Sx during the separation process.

Figure 2:
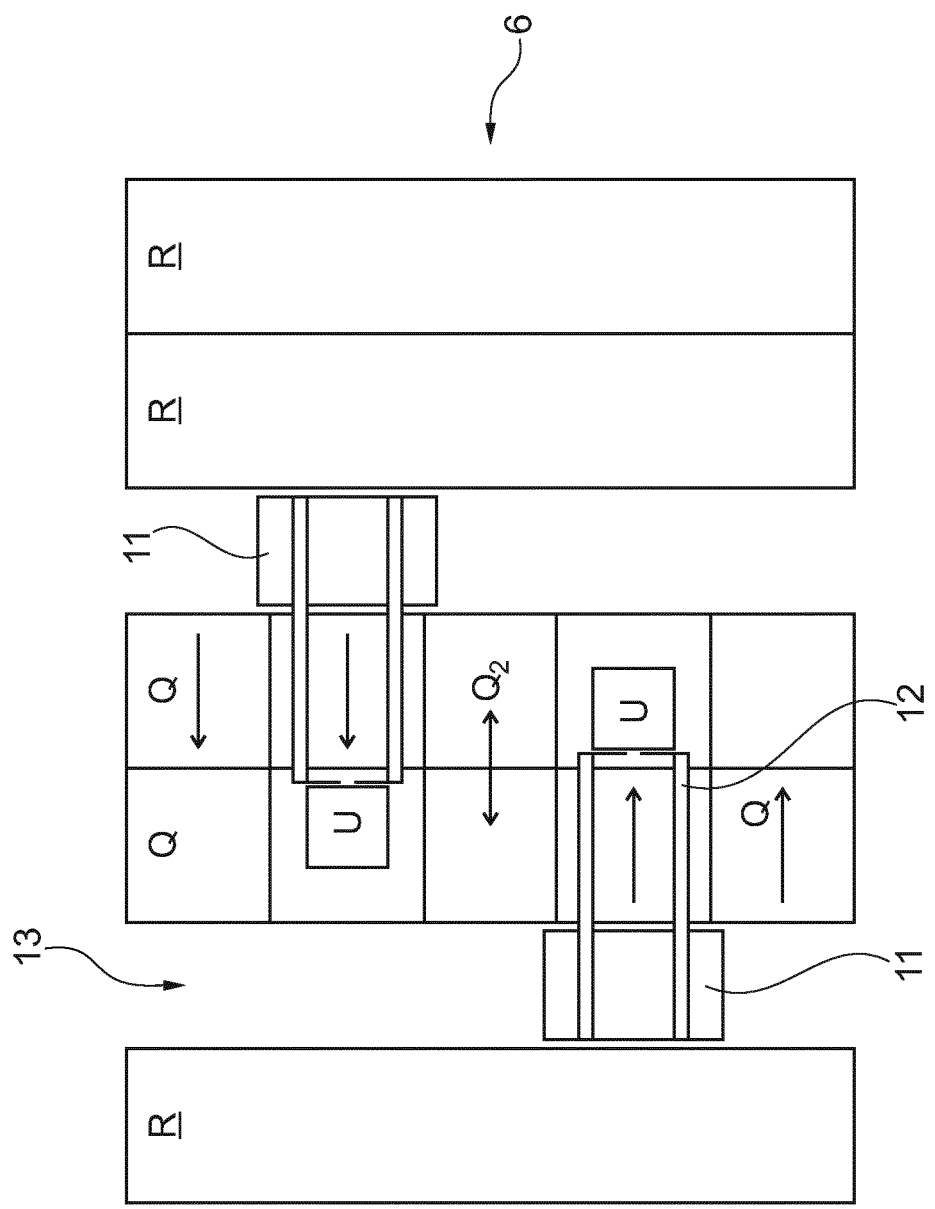
FIG. 2 shows a typical schematic plan view of exchange of transport units between racks within the racking storage in the automated storage Facility of FIG. 1.

The automated storage II comprises a storage racking 6 comprising a plurality of multilevel storage racks R in which order and/or product receptacles, in general designated with U, are stored, wherein the storage racks R are disposed back-to-back in pairs and have an aisle 13 between pairs (see also FIG. 2). The aisles 13 are connected to semi or full-automated picking stations 7 through conveyor installations 8, which encompass at least one storage-entry conveyor 14 provided for feeding order and/or product receptacles, universally designated as U, into the storage racking 6, R, and at least one storage-exit conveyor 15 provided for retrieval of order and/or product receptacles U from the storage racking 6, R. So the semi/full automatic picking station 7 for picking from product receptacles D (D for donor) into order receptacles O (O for order) for fulfilling orders are fed by the at least one storage-exit conveyor 15 and order and/or product receptacles are returned to the storage rack by the at least one storage-entry conveyor 14. The product receptacles may also encompass separated product receptacles S1, 2, 3 ... x.

The routing conveyor 5 is also connected to the at least one inbound storage-entry conveyor 14 and the at least one storage-exit conveyor 15.

Each storage racking aisle 13 has one automatic storage and retrieval device in the form of a shuttle 11 provided in each level or each few levels for storage and retrieval of order and/or product receptacles in the storage racks R.

Order and/or product receptacles U are exchanged directly between two adjoining storage racks R from a source storage rack to an adjacent destination storage rack via cross conveyance locations Q in the storage racks themselves (see FIG. 2), which can be one way exchange locations Q or bidirectional. The shuttle 11 itself displaces the order or product receptacles U in the cross conveyance locations Q actively with its load handling means 12, which are telescopic arms on both sides of a loading platform and are equipped with unit handling levers. There is no active drive means within the racks R themselves.

The shuttle 11 of a source rack places the order or product receptacles U into the cross conveyance location Q in an adjacent destination rack, so that the shuttle operating in the according, neighboring aisle can handle the unit by normal deep operation. In other words, the sourcing shuttle operates deeper than for normal single or double deep storage, e.g. triple deep for exchange. Therefore it is possible to transfer receptacles U through the storage racking 6 in the sense of arrow 9 without leaving the storage.

Figure 3:
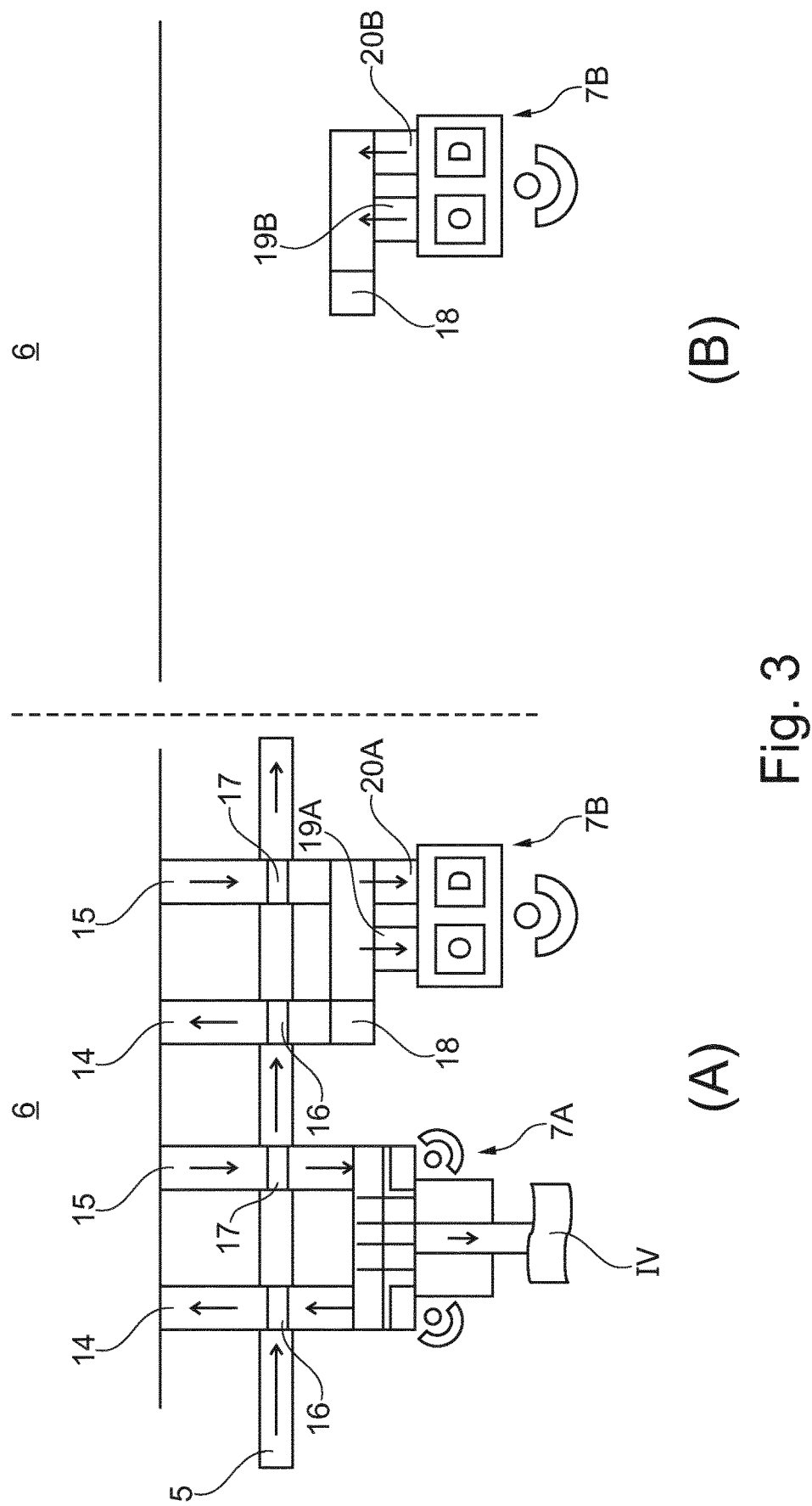
FIG. 3 shows a typical schematic plan view of a first and second picking level in a storage facility with a single level routing conveyor.

According to FIG. 3 the semi/full-automated picking stations 7 may have many different configurations. In FIG. 3 the semi-automated picking station 7A (left hand side) is directly connected to an aisle 13 of the storage racking 6 via one storage-entry conveyor 14 and one storage-exit conveyor 15, which in turn are connected/pass through the routing conveyor 5 by right-angle-transfer-devices 16, 17, also called RAT in the art. The semi-automated picking station 7A incorporates one/two work places for pickers and in between a dispatch conveyor for direct dispatch of complete orders to the shipping area III. Such a station is ideal for small orders as in e-commerce.

Alternatively or in addition full-automated picking stations 7B may be used, which is arranged in such a way as to receive order receptacles O and product receptacles D in level A via one storage-entry conveyor 14 and one storage-exit conveyor 15, which in turn are connected/pass through the routing conveyor 5 by right-angle-transfer-devices 16, 17, as before, but end in servicing conveyors 19A for order receptacles O and 20A for product or donor receptacles D. However the dispatch of the order receptacles O and product or donor receptacles D is performed by servicing conveyors 19B for order receptacles O and 20B for product or donor receptacles D on a higher level B (right hand side). This is achieved by a level changing conveyor device 18 which routes onto the storage-entry conveyor 14 on level A.

Figure 4:
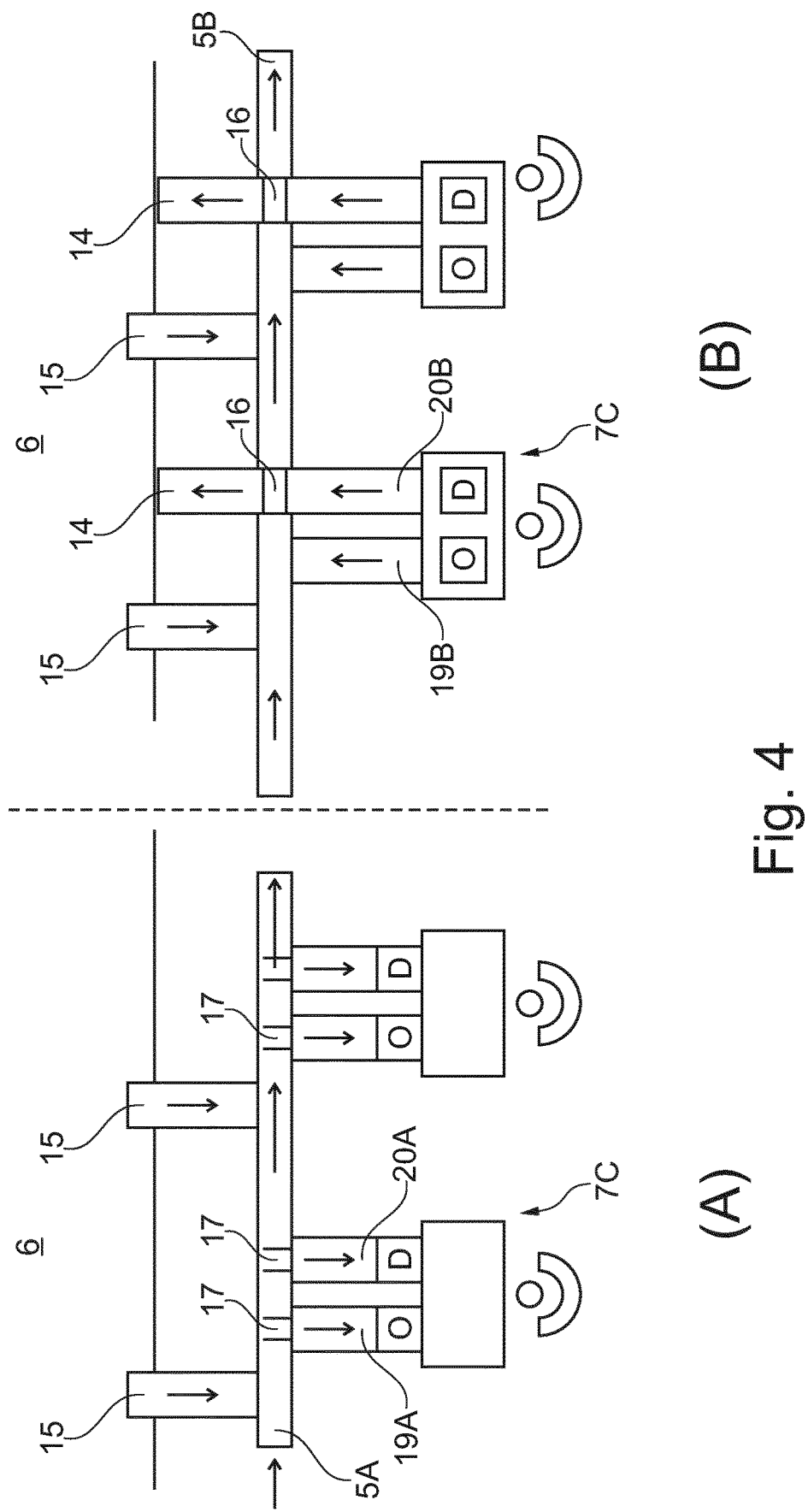
FIG. 4 shows a typical schematic plan view of a picking level in a further storage facility with a two level routing conveyor.

The routing conveyor 5 has only one level in level A and can be used to supply complete orders to the shipping area III. Alternatively, as depicted in FIG. 4, the routing conveyor 5 may have two levels 5A and 5B, i.e. one conveying level in each level A (left hand side) and B (right hand side).

In level A the picking station 7C is supplied with order receptacles O and product receptacles D similar as above, but the servicing conveyors 19A and 20A are not directly aligned with the storage-exit conveyors 15 but are located downstream on the routing conveyor 5A and reachable by using RAT 17.

Level B is therefore used for dispatch of order receptacles O and product receptacles D from picking station 7C, by servicing conveyors 19B for order receptacles O and 20B for product or donor receptacles D on a higher level B (right hand side). Servicing conveyor 19B is not aligned with storage-entry conveyor 14 (in analogy to level A) but via RAT 16 downstream. In contrast servicing conveyor 20B is aligned with storage-entry conveyor 14. Therefore order receptacles O from picking station 7C may pass through RAT 16 and be conveyed downstream on routing conveyor 5, whereas product receptacles D can be directly routed back into storage. Also order receptacles O may be redirected by RAT 16 into storage.

The storage and picking described above therefore allows order receptacles containing completed orders to be dispatched via the routing conveyor 5 to the shipping area III or introduced into the storage racking 6 of the automated storage via the at least one storage-entry conveyor for later dispatch; order receptacles containing completed orders coming from the storage racking 6 of the automated storage II to be dispatched via the routing conveyor 5 to the shipping area III; order receptacles containing completed orders coming from the semiautomatic pack station 7 of the automated storage II to be dispatched via the routing conveyor 5 to the shipping area or introduced into the storage racking 6 of the automated storage area II via the at least one storage-entry conveyor 14 for later dispatch, and; order and/or batch receptacles containing partial orders coming from the semi/full picking station 7 of the automated storage II are introduced into the storage racking of the automated storage and retrieved to semi/full automatic pack station 7 for further processing.

At least one lift 21 is used for changing levels of the receptacles, in order to transfer the order and/or product receptacles to the at least one storage-exit conveyor 15 and to receive order and/or product receptacles from the storage-entry conveyor 14. Lift 21 may have more than one location for receptacles, in order to carry more than one receptacle at the same time. How many lifts 21 are used and how these are arranged depends on the specific implementation.

The invention claimed is:

1. A method of fulfilling orders comprising:
   storing items needed to fulfill orders from a queue of a plurality of orders in an automated storage facility and storing items of the same kind in receptacles containing several same items, wherein the automated storage facility comprises aisles and a three dimensional racking for storage of receptacles;
   retrieving and transporting of the receptacles containing items for fulfillment of a certain order to one of a plurality of picking stations of the automated storage facility via automatic storage and retrieval shuttles for specific item retrieval for fulfilling said certain order when all of the items to complete said certain order are available or stored in the automated storage facility;
   packing retrieved items with other retrieved items of an order at said picking station for order fulfillment, wherein each aisle is directly connected to one of said plurality of picking stations and receptacles containing items for orders to be fulfilled at such connected picking station are stored within the connected aisle;
   checking according to predetermined criteria at the time of retrieval of a specific receptacle containing an item for said certain order whether the same item is needed for fulfillment of one or more subsequent orders at one or more different picking stations and, if this is the case, placing one or more of the same items from the specific receptacle into one or more separate receptacles for dedicated storage in different aisles of said automated storage facility according to the different picking station assignment for said one or more subsequent orders, with the total number of the same items needed for said one or more subsequent orders associated with a particular one of the different picking stations being placed into a selected one of the separate receptacles.

2. The method as claimed in claim 1, wherein the total number of same items needed for more than one subsequent order associated with the particular different picking station are placed into the selected one of the separate receptacles.

3. The method as claimed in claim 1, wherein the checking according to predetermined criteria is performed by a control system of the automated storage facility.

4. The method as claimed in claim 1, wherein the number of same items needed for one subsequent order associated with the particular different picking station are placed into the selected one of the separate receptacles.

5. The method as claimed in claim 1, wherein one same item for a subsequent order is placed in the selected one of the separate receptacles.

6. The method as claimed in claim 1, wherein separation of items is performed at a dedicated separation station or at said picking station.

7. The method as claimed in claim 1, further comprising transferring of receptacles directly between adjoining racks by pushing or pulling the receptacles from a source rack location of a first rack to a destination rack location of an adjoining second rack via the automatic storage and retrieval shuttles.

8. The method as claimed in claim 1, wherein the racking of the automated storage facility comprises multiple levels, and wherein the automatic storage and retrieval shuttles service each aisle and each level.

9. The method as claimed in claim 1, wherein the predetermined criteria for the checking according to predetermined criteria comprises one or a combination of
   a) whether the same item is needed for fulfillment of subsequent orders from the queue at the given point in time;
   b) whether the same item is needed for fulfillment of subsequent orders from the queue at the given point in time within a predetermined time window;
   c) whether the same item is predicted to be needed for fulfillment of subsequent orders based upon past order history within a predetermined time window.

10. The method as claimed in claim 9, wherein the total number of same items needed for more than one subsequent order associated with the particular different picking station are placed into the selected one of the separate receptacles.

11. The method as claimed in claim 9, wherein the number of same items needed for one subsequent order associated with the particular picking station are placed into the selected one of the separate receptacles.

12. The method as claimed in claim 9, wherein one same item for a subsequent order is placed in the selected one of the separate receptacles.

13. A method of fulfilling orders comprising:
   storing items needed to fulfill orders from a queue of a plurality of orders in an automated storage facility and storing items of the same kind in receptacles containing several same items, wherein the automated storage facility comprises aisles and a three dimensional racking for storage of receptacles, and wherein each aisle is directly connected to one of a plurality of picking stations and receptacles containing items for orders to be fulfilled at such connected picking station are stored within the connected aisle;
   retrieving and transporting of the receptacles containing items for fulfillment of a certain order to the associated connected picking station of the automated storage facility connected for specific item retrieval for fulfilling said certain order when all of the items to complete an order are available or stored in the automated storage facility;
   checking according to predetermined criteria at the time of retrieving each specific receptacle containing an item for the certain order whether the same item is needed for fulfillment of subsequent orders at one or more different picking stations and, if the same item is needed for fulfillment of subsequent orders at a different picking station, placing one or more of the same items from the specific receptacle into one or more separate receptacles for dedicated storage in different aisles of said automated storage facility according to the picking station assignment for said subsequent orders at different picking stations; and
   packing retrieved items with other retrieved items of an order at said picking station for order fulfillment.

14. The method as claimed in claim 13, wherein said retrieving and transporting of the receptacles containing items for fulfillment of said certain order is done via automatic storage and retrieval shuttles.

15. The method as claimed in claim 13, wherein the predetermined criteria for said checking at the time of retrieving each specific receptacle comprises one or a combination of
   a) whether the same item is needed for fulfillment of subsequent orders from the queue at the given point in time;
   b) whether the same item is needed for fulfillment of subsequent orders from the queue at the given point in time within a predetermined time window;
   c) whether the same item is predicted to be needed for fulfillment of subsequent orders based upon past order history within a predetermined time window.

16. The method as claimed in claim 13, wherein the total number of same items needed for subsequent orders associated with an aisle or certain picking station are placed into one selected separate receptacle.

17. The method as claimed in claim 13, wherein the total number of same items needed for subsequent orders of neighboring aisles or neighboring picking stations are placed into one selected separate receptacle.

18. The method as claimed in claim 13, wherein the number of same items for each subsequent order are placed into a dedicated selected separate receptacle for each subsequent order.

19. The method as claimed in claim 13, wherein one same item for a subsequent order is placed in each separate receptacle.

* * * * *